United States Patent Office 2,801,842
Patented Aug. 6, 1957

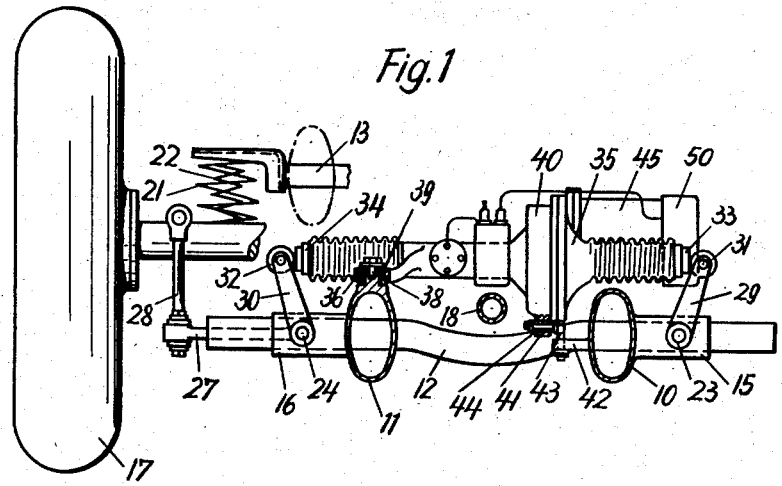
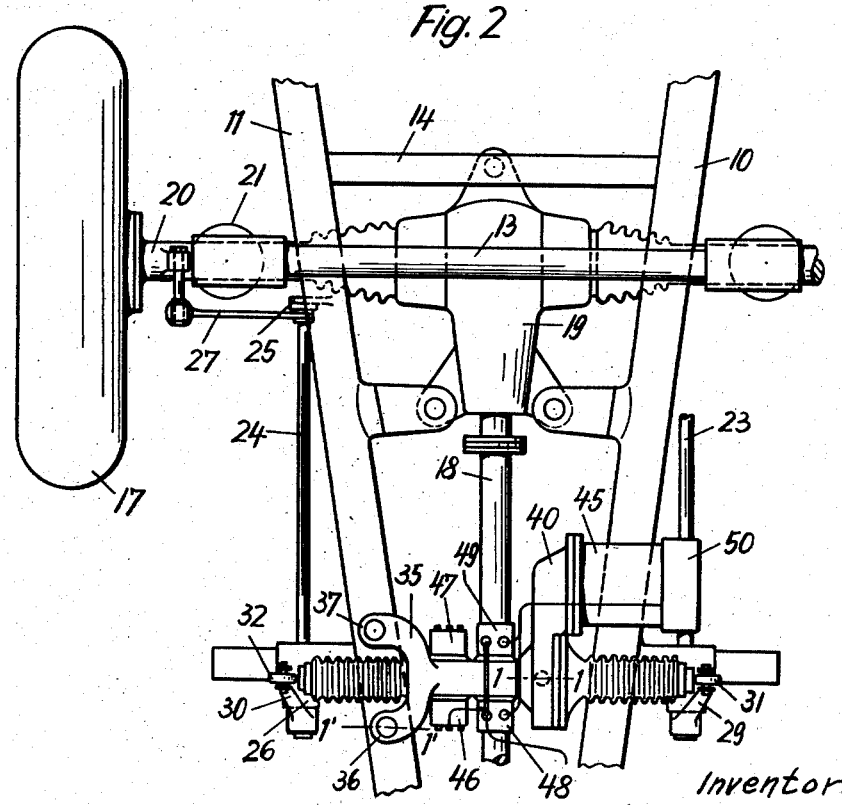

2,801,842

ARRANGEMENT FOR MOUNTING A SPRING TENSION ADJUSTING DEVICE OF VEHICLE SPRING SUSPENSIONS

Franz T. Roller and Albert E. Roller, Stuttgart, Germany, assignors to Daimler-Benz Aktiengesellschaft, Stuttgart-Unterturkheim, Germany Application October 18, 1952, Serial No. 315,458

Claims priority, application Germany October 18, 1951

9 Claims. (Cl. 267—57)

The invention relates to a device for regulating the spring tension of spring suspensions of vehicles and is particularly concerned with torsion bars arranged in the longitudinal direction of the vehicle near the side members of the frame and serving as auxiliary springs.

An object of the invention is to avoid vibrations and noises to be transmitted to the frame or the body by way of the regulable spring suspension.

A further object of the invention is to avoid warpings of the frame or of the body to be fully effective on the regulating mechanism so that the regulating mechanism will be stressed as little as possible and its weight will be relatively low.

A further object of the invention deals with an arrangement mechanically and constructionally particularly favorable for the simultaneous adjusting of the springs on either side of the vehicle.

A further object of the invention is such an arrangement of the regulating mechanism as to be directly supported at the side members of the frame, and will thus be protected by the same against damage.

The invention is above all of importance for adjustable auxiliary springs in connection with swinging or pendulous semi-axles as it is most important that in this case with most different loads the inclined position of the semi-axle to the horizontal remains substantially or maintained within a certain range.

Further objects and particulars of the present invention will be brought out in the following description of an example of design. In the accompanying drawing there is illustrated in Fig. 1 a fractional sectional view of the spring regulating unit taken along line 1—1 and 1'—1' in Fig. 2 and in Fig. 2 a plan view of the arrangement according to Fig. 1.

In the drawings reference numerals 10 and 11 designate, for instance, tubular frame side members having a V- or X-shaped course, which are rigidly connected by cross members 12, 13 and 14. In this case the cross member 12 is passed through the frame side members and reinforced by means of strengthening sleeves connected with the side members.

The rear wheels 17 are driven by the engine located at the front end of the vehicle by way of the propeller shaft 18, the axle gear housing 19, and the pendulous semi-axles 20, which are linked to the axle gear housing. The pendulous semi-axles 20 are sprung against the ends of the frame cross member 13 by means of coil springs 21 and auxiliary coil springs 22, which are disposed within the coil springs 21 so as to bring about a progressive springing.

Furthermore, torsion bars 23 and 24 which serve as auxiliary springs, are provided outside the frame near the side members. Each of these torsion bars is mounted in a bearing 25 at one of the side members and in a bearing 26 within the frame cross member 12 and connected to the semi-axles 20 by means of lever arms 27 and rods 28. For bedding or bearing the torsion bars as well as for connecting the same to the pendulous semi-axles rubber elements may be provided as intermediate members.

Lever arms 29 and 30 are fixed to the ends of torsion bars 23 and 24 near the frame, for instance by means of serrations. The upper ends of the lever arms 29 and 30 support themselves by way of rolls or rollers 31 and 32 against the rams 33 and 34, which are axially adjusted by the regulating mechanism arranged within the housing 35.

The housing 35 which is substantially tubularly shaped extends transversely to the direction of travel and is disposed above the side members 10 and 11 so that the rams, which are axially adjustable within the housing, can directly act on the lever arms of the torsion bars. The one end of this housing branches off so as to form bearing lugs 36 and 37 for mounting it elastically on the frame side member 11 in two points. For this purpose the side member is provided with two vertical pins 38 screwed or welded on it. Upon the upper ends of the said pins there are put the bearing lugs 36 and 37, each with interposed conical rubber rings 39 directed one against the other. Instead of the rubber rings 39 a double-conical rubber bushing or other rubber bearing members adapted to absorb transverse and thrust loads may also be used.

In order to mount the housing at a third point on the frame consisting of the longitudinal side members 10 and 11 and the cross members 12, 13 and 14, the housing 35 is provided with a pin or bearing lug 41 having a transversely directed bore. The pin or bearing lug 41 is located at the lower side of the widened section 40 in which the reduction gear is disposed. An angularly bent pin 43 which is fastened in a bracket 42 engages the transverse bore in the bearing lug 41 by means of an interposed rubber bushing 44. The bracket 42 is secured in any conventional manner to the frame within the region of the intersection of the longitudinal side member 10 and the transverse or cross member 12, and may be secured either to the side member 10 or to the transverse member 12 as shown in the drawing.

For driving the regulating gear an electric motor 45 flanged to the widened housing section 40 is used, which appropriately drives the rams 33 and 34 by way of a reduction gear 40 and threaded sleeves. The regulating gear can be put into action automatically, for instance, in dependence on the load of the vehicle or by the driver himself. For controlling the direction of rotation of the motor, by way of example, the switches 46 and 47 and the relay devices 48 and 49 for forward and reverse speed of the gear are flanged on either side to the tubular housing 35 between the broadened section 40 of the housing and the branched section 36, 37. The end control may be effected automatically, for example, by stops connected with one of the rams or arranged in any other appropriate way, e. g. in a housing section 50 assembled with the motor 45.

By driving the motor 45 in one or another direction, i. e. by controlling a change clutch arranged between the motor and the rams, the rams 33, 34 can be shifted in one or another direction, whereby the springs 23 and 24 will be more or less tensioned, or even completely released, if so desired.

Owing to the elastic support of the regulating gear housing in the three points 36, 37 and 41, the housing is noise-isolated against the frame or the body, so that the housing does not propagate shocks and vibrations. The described arrangement of the regulating device allows an advantageous locating between the frame and the body, e. g. under or behind the seats, with a simultaneous direct connection of the regulating members with the ends of the torsion bars near the frame.

The present invention is not restricted to the described example of design, but can be varied at will within the scope of the different features of the invention.

What is claimed is:

1. In a vehicle having a superstructure including two frame members extending at a distance from one another, at least one vehicle wheel, spring means supporting said wheel against said superstructure, spring abutment means supporting said spring means against said frame members, regulating gear means including a motor and reversing means for said motor for drivingly adjusting said spring abutment means, and elastic means supporting said regulating gear means in two joints at one of said frame members with the axis thereof extending in a first direction and in one point at the other of said frame members with the axis thereof extending in a second direction different from said first direction.

2. In a vehicle, at least one vehicle wheel, two frame members extending at a distance from each other, a torsion rod, means supporting said torsion rod at one of said frame members, a lever arm connecting one end of said torsion rod with said wheel, a further lever arm at the other end of said torsion rod, a regulating gear mechanism with an electric motor securely fastened to said regulating gear mechanism, means including said regulating gear mechanism and motor adjustably positioning said further lever arm, and elastic means supporting said gear mechanism in two points at one of said frame members and in one point at the other of said frame members, the axes of some of said elastic means extending in different directions with respect to each other.

3. In a vehicle, the combination according to claim 1, further comprising other spring means springingly supporting said road wheels against said vehicle superstructure independently of said regulating gear means.

4. In a vehicle, two frame side members running at a distance from each other longitudinally to the vehicle, two road wheels, spring means for springing the road wheels against the frame side members, a regulating gear for the vehicle springs with adjusting members arranged substantially transversely to the frame side members and abutting against the ends of said spring means, said regulating gear comprising an electric motor, a gear housing connected with said electric motor, a guiding housing for said adjusting members connected to said gear housing and running transversely to the vehicle side members, two forked ends of the guiding housing opposite to the gear housing, a lug provided on said lower side of said gear housing, and elastic means for elastically fastening said adjusting gear at said frame side members, said elastic means connecting said forked ends with the one frame side member and said lug with the other frame side member.

5. In a vehicle, the combination according to claim 4, comprising switch means on said guiding housing, relay means on said guiding means, and means including an electric circuit inter-connecting said switch means, said relay means and said electric motor operating said regulating gear.

6. In a vehicle, two frame side members extending in spaced relation from each other, two road wheels, two springs located along said frame side members, means connecting one end of each of said springs with a corresponding wheel, regulating gear means arranged substantially transversely to said frame side members including adjusting members also directed transversely, means at the other end of each of said springs abutting against said adjusting members for adjusting said other ends in the direction of spring action of said springs during adjustment of said adjusting members, elastic means elastically mounting said regulating gear means in two points on one of said two side members and in one point at the other of said side members, said regulating gear means including a housing forked at one end forming bearing lugs and provided near another end with a further bearing lug on the lower side of the housing, and means including said elastic means mounting said regulating gear means by way of the two first-named bearings lugs on top of the one frame side member and by way of the last-named bearing lug on one side of the other frame side member, the regulating gear means crossing the frame side members substantially on their top side.

7. In a vehicle, a vehicle superstructure, two road wheels, means springing said road wheels against the superstructure, regulating gear means for the vehicle springs with adjusting members arranged substantially transversely to the longitudinal axis of the vehicle and abutting against the end of said spring means, said regulating gear means comprising an electric motor, a gear housing connected with said motor, a guiding housing for said adjusting members connected to said gear housing extending transversely to the longitudinal axis of the vehicle, and elastic means elastically fastening said regulating gear in three points at said superstructure, two of said points lying in essentially the same horizontal plane and being displaced with respect to each other by a relatively small distance while the third point is disposed in a different horizontal plane and displaced from each of the two first-mentioned points by a relatively large distance in the transverse direction of the vehicle.

8. In a vehicle, a frame including two frame side members extending at a distance from each other longitudinally to the vehicle and at least one cross member connecting said two side members, two road wheels, means springing the road wheels against the frame side members, regulating gear means for the vehicle springs with adjusting members arranged substantially transversely to the frame side members and abutting against the ends of the spring means, said regulating gear means including driving means, means connecting said driving means to said adjusting members and housing means for said adjusting members, said last-named housing means and said driving means being securely fastened together into a unitary structure and extending substantially transversely to the vehicle side members, and elastic means securing said regulating gear means at said frame in three points with two points thereof being disposed in the region of one of said side members and with the other point being disposed in the region of the connection of said cross member with the other of said side members, the axis of the elastic means at said two points extending in different directions from the axis of the elastic means at said other point.

9. In a vehicle, the combination according to claim 8 wherein the elastic means at said third point is connected with said cross member.

References Cited in the file of this patent

UNITED STATES PATENTS

| | | |
|---|---|---|
| 2,010,415 | Roller | Aug. 6, 1935 |
| 2,068,994 | Lord | Jan. 26, 1937 |
| 2,161,431 | Rabe | June 6, 1939 |
| 2,191,211 | Krotz | Feb. 20, 1940 |
| 2,210,485 | Hawkins | Aug. 6, 1940 |
| 2,611,625 | Kishline | Sept. 23, 1952 |
| 2,705,139 | Nallinger | Mar. 29, 1955 |

FOREIGN PATENTS

| | | |
|---|---|---|
| 782,310 | France | Dec. 5, 1934 |
| 836,914 | France | Oct. 25, 1938 |